United States Patent [19]
Craggs et al.

[11] Patent Number: 5,096,654
[45] Date of Patent: Mar. 17, 1992

[54] SOLID PHASE DEFORMATION PROCESS

[75] Inventors: Gordon Craggs, Leeds, England; Anthony K. Powell, West Lothian, Scotland; Ian M. Ward, Bramhope, England

[73] Assignee: The National Research and Development Corporation, England

[21] Appl. No.: 379,735

[22] Filed: Jul. 13, 1989

Related U.S. Application Data

[63] Continuation of Ser. No. 222,995, Jul. 21, 1988, abandoned.

[30] Foreign Application Priority Data

Jul. 24, 1987 [GB] United Kingdom ............... 8717631

[51] Int. Cl.$^5$ .............................................. B29B 11/12
[52] U.S. Cl. ................................... 264/570; 264/126; 264/235; 264/236; 264/323; 264/331.17; 264/333
[58] Field of Search ............... 264/570, 210.2, 331.17, 264/126, 320, 323, 235, 333, 236; 425/78 R

[56] References Cited

U.S. PATENT DOCUMENTS

| | | | |
|---|---|---|---|
| 3,507,941 | 4/1970 | Kies et al. | 264/570 |
| 3,642,976 | 2/1972 | Buckley et al. | 264/323 |
| 3,714,320 | 1/1973 | Shaw | 264/323 |
| 3,846,522 | 11/1974 | Goldman | 264/126 |
| 3,944,536 | 3/1976 | Lupton et al. | 264/331.17 |
| 3,975,481 | 8/1976 | Baumgaertner | 264/126 |
| 4,110,391 | 8/1978 | Berzen et al. | 264/126 |
| 4,246,390 | 1/1981 | Seaver | 264/331.17 |
| 4,510,108 | 4/1985 | Cleereman et al. | 264/235 |
| 4,587,163 | 5/1986 | Zachariades | 264/331.17 |

FOREIGN PATENT DOCUMENTS

| | | | |
|---|---|---|---|
| 61-143112 | 6/1986 | Japan | 264/323 |
| 61-143113 | 6/1986 | Japan | 264/323 |
| 61-177225 | 8/1986 | Japan | 264/323 |
| 656300 | 8/1951 | United Kingdom . | |
| 1052090 | 12/1966 | United Kingdom . | |
| 1201485 | 8/1970 | United Kingdom . | |
| 1220182 | 1/1971 | United Kingdom . | |
| 1311885 | 3/1973 | United Kingdom . | |
| 1327140 | 8/1973 | United Kingdom . | |
| 1480479 | 7/1977 | United Kingdom . | |
| 2060469 | 5/1981 | United Kingdom . | |
| 2157298A | 10/1985 | United Kingdom . | |

OTHER PUBLICATIONS

"Processing of Semicrystalline Polymers by High-Stress Extrusion", Kolbeck et al, J. of Polymer Science, vol. 15, pp. 27–42 (1977).
Zachariades, A. E. "Recent Developments in Ultramolecular Orientation of Polyethylene by Solid State Extrusion," pp. 77–115, (1979).
Bassett, D. C. "The Crystallization of Polyethylene at High Pressures," pp. 115–150, (1982).
Keller, A. "Routes to High Modulus by Ultra-Orientation of Flexible Molecules," pp. 321–355, (1979).
Yasuniwa, M. et al. "Melting and Crystallization Process of Polyethylene Under High Pressure," Polymer Journal, vol. 4, No. 5 (1973), pp. 526–533.
Lupton, J. M. et al. "Physical Properties of Extended--Chain High-Density Polyethylene," J. Applied Polymer Science, vol. 18 (1974), pp. 2407–2425.
"Phenomenology of Chain-Extended Crystallization in Polyethylene", Philosophical Magazine, vol. 29, No. 4, p. 941 (1974).
Chuah, H. H. et al., "Solid-State Extrusion of Chain--Extended Polyethylene."
The Fourth Cleveland Sympsosium on Macromolecules (1983).

*Primary Examiner*—Jeffery Thurlow
*Attorney, Agent, or Firm*—Finnegan, Henderson, Farabow, Garrett & Dunner

[57] ABSTRACT

A process for the solid phase deformation of orientable, semi-crystalline, thermoplastic, polymeric material, in particular polyethylene, is provided in which an improvement of the mechanical properties of the polyethylene is achieved. The process for producing a product from linear polyethylene includes forming a workpiece which is to be extruded in the solid phase by consolidating a mass of solid particulate linear polyethylene under heat and pressure. The resulting workpiece is subjected to heat treatment under pressure to cause the polyethylene to crystallize in an extended chain morphology and to have a melting point of at least 139.5° C. and a density of at least 0.98 g/cm³. Thereafter the workpiece of polyethylene is deformed in the solid phase to provide a polyethylene product by, for example, passage through a die, the workpiece being subjected to a deformation extrusion ratio of at least 3 and preferably 3 to 25. The process in accordance with the invention allows more efficient processing of linear polyethylene having a weight average molecular weight of greater than 350,000 than had hitherto been possible.

14 Claims, 1 Drawing Sheet

SOLID PHASE DEFORMATION PROCESS

This application is a continuation, of application Ser. No. 07/222,995 filed July 21, 1988, now abandoned.

This invention relates to solid phase deformation processes, and more particularly to the solid phase deformation of orientable, semi-crystalline, thermoplastic polymeric materials.

PRIOR ART

During the past twenty years or so, a substantial amount of research has been carried out into the improvement of mechanical properties of flexible polymers, principally by orientation. The required very high orientation of the molecular chains of flexible polymers, notably linear polyethylene, may be obtained either by preventing the formation of chain-folded crystallites, as with precipitation from solution in an extensional flow regime, or by transforming a previous chain-folded morphology into one comprising extended molecular chains, as occurs using mechanical deformation; see, for example, UK Patent Specifications Nos. 1480479 and 2060469B.

The above-mentioned prior processes produce a high degree of anisotropy in the structure of the polymer, with concomitant improvement in mechanical properties in the machine direction.

British Patent Specification 2157298A describes and claims a process for the deformation of a workpiece comprising an orientable, thermoplastic polymer by passage in the solid phase through a die having both an entry side and an exit side, which process comprises providing the workpiece comprising the orientable, thermoplastic polymer which is initially present, at least in part, in an extended chain crystalline morphology at the entry side of the die; causing the workpiece to deform in the solid phase through the die; and collecting the deformed workpiece from the exit side of the die. This specification indicates that the weight average molecular weight ($M_w$) of polyethylene used in the process may be from 50,000 to 3,000,000. However, it is difficult to process higher molecular weight polyethylene according to the teaching of this prior specification, especially polyethylene with a $M_w$ of greater than 300,000, more particularly greater than 350,000.

The present invention seeks to provide a process comprising a solid phase deformation in which an improvement in mechanical properties of the polyethylene is achieved with more satisfactory processing conditions, and constitutes especially an improvement over the process described in Specification No. 2157298A.

DESCRIPTION OF THE INVENTION

According to the present invention there is provided a process for producing a product comprising linear polyethylene which process comprises forming a workpiece which is to be extruded in the solid phase by consolidating under heat and pressure a mass of solid particulate linear polyethylene to form a solid cohered material, subjecting the resulting workpiece to heat treatment under pressure to cause the polyethylene to crystallise in an extended chain morphology with the melting point of the polyethylene being increased to at least 139.5° C. and the density to at least 0.98 g/cm³, and thereafter deforming a workpiece of the resulting polyethylene in the solid phase, for example by passage through a die, to provide the polyethylene product whereby the workpiece is subjected to a deformation extrusion ratio of at least 3, and preferably 3 to 25.

The consolidation under heat and pressure of the mass of solid particulate linear polyethylene is carried out under conditions below the melting point of the polyethylene at the applied pressure with the melting only of a surface layer of the particles to form a solid cohered material. The procedure results in the formation of a solid piece of polyethylene which visually has the appearance of a similar extruded product, but it is an advantage of this procedure that the optimum entanglement occurs between molecules of polyethylene of adjacent particles and this has been found to be important in achieving the benefits provided by this invention.

Preferably the workpiece is formed by consolidating a mass of solid particulate linear polyethylene by compression of as-polymerised polyethylene at ambient temperature using high pressure of the order of 150 to 250, preferably about 200 MPa required, and thereafter lowering the pressure to 100 to 160, preferably about 130 MPa. Preferably the compacted powder is then heated to a temperature of from 130° to 150° C., and preferably about 140° C., whereby the polyethylene powder is consolidated into a compacted workpiece by melting only a surface layer of the particles to a solid cohered material. The polyethylene of the resulting workpiece is suitable for annealing to produce the chain extended morphology required by the process of this invention.

Preferably, the deformation effects a reduction in the bulk cross-sectional area of the workpiece. (By 'bulk cross-sectional area' is meant the area of the bulk of the workpiece normal to the machine direction.) This deformation is readily achieved by means of a reducing die. However, deformation in accordance with the invention can be achieved by drawing a workpiece through a pair of opposed pressure rolls.

From a commercial standpoint, the process of the present invention is of particular importance in relation to linear polyethylene having a weight average molecular weight ($M_w$) from 300,000 or 350,000 to 3,000,000, preferably from 350,000 to 1,500,000, and especially from 750,000 to 1,000,000.

The term "workpiece" as used herein includes bars, strips, rods, tubes and other cross-sections of solid or hollow stock. The term includes both billets and other forms of stock of greater length; indeed, continuous stock, which may be formed as the process is performed, may be utilised.

The workpieces used in the process of this invention may comprise a filler. Examples of useful fibrous fillers include glass, asbestos, metal, carbon and ceramic whiskers, such as those formed from silicon carbide. Examples of useful laminar fillers include mica, talc and graphite flakes. Chalk and fly ash may also be included. The amount of filler which may advantageously be included depends on the nature of the filler, but up to 50% by weight, preferably from 5 to 30%, especially from 5 to 20% may be incorporated into the polyethylene prior to the consolidation of particles to form a workpiece.

In accordance with a preferred aspect of this invention the workpiece is caused to deform through the reducing die in the solid phase by hydrostatically extruding it therethrough. Draw-assisted hydrostatic extrusion, as described in British Patent Specification No. 1480479, may be utilised with advantage. The net hydrostatic pressure (that is, the difference between the applied extrusion pressure and the applied extrudate pressure) for extrusion to occur will, at a given extrusion temperature, increase with increasing extrudate pressure and will, at a given extrudate pressure, decrease with increasing temperature. A value from 20 to 300 MPa, preferably from 50 to 200 MPa, for example 100 MPa, is suitable.

The workpiece may also be deformed by drawing it through a heated reducing die without hydrostatic pressure. As the deformation temperature increases (and it may increase to high values where high ambient pressures are used as the melting point of the linear polyethylene increases by approximately 20° C. for each 100 MPa of applied pressure) above 200° C. process control becomes increasingly difficult. It is, therefore, preferred to employ hydrostatic extrusion into an atmospheric pressure with the polyethylene at a temperature from 90° C. to 120° C. as it undergoes extrusion.

While nominal deformation ratios ($R_N$) of up to 50, for example 20, have been obtained with linear polyethylene it is a feature of the process of the present invention that more effective deformation is attained. That is, a given enhancement of a physical property may be attained at a lower deformation ratio by the present process starting from particulate polyethylene. Accordingly, $R_N$ is suitably from 4 to 20, preferably from 8 to 14.

The compacting of the particulate polyethylene may be effected in a separate operation, as is preferred, or may be effected in an extrusion apparatus prior to annealing and deformation, it being understood that the apparatus should preferably be capable of withstanding a pressure of 600 MPa at a temperature of 260° C. Chain-extended crystalline morphology is found to be imparted to the polymer at pressure above 350 MPa (but it is not usually necessary to exceed 480 MPa) and temperatures above 220° C. It is generally preferred to produce the chain-extended crystalline morphology at 450 MPa and 235° C.

The presence of chain-extended crystalline morphology in linear polyethylene is manifest by an increased melting point (DSC) and a higher density: these are, respectively, at least 139.5° C. or 140° C. and at least 0.98 g/cm$^3$.

The invention also includes linear polyethylene prepared by the process of the present invention. This invention further includes oriented linear polyethylene having a weight average molecular weight of at least 350,000, and preferably from 350,000 to 1,000,000 which has been deformed to a deformation ratio of from 3 to 20, and which has a Young's modulus of at least 30 GPa and has a melting point of at least 139.5° C. particular polyethylenes processed in accordance with this invention may have deformation ratios of for example 10, and which has a Young's modulus of at least 30 GPa, preferably, at least 35 GPa.

Furthermore, this invention includes a set hydraulic cementitious or organic thermoset mass which incorporates a reinforcement constituted by linear polyethylene prepared by the process of the invention. The reinforcement may be in the form of rods, monofilaments, tubes, tapes or the like, and may be non-circular in cross-section.

BRIEF DESCRIPTION OF THE DRAWINGS

The invention will now be further illustrated by way of examples with reference to the accompanying drawings, in which.

DETAILED DESCRIPTION OF THE DRAWINGS

Figure 1:
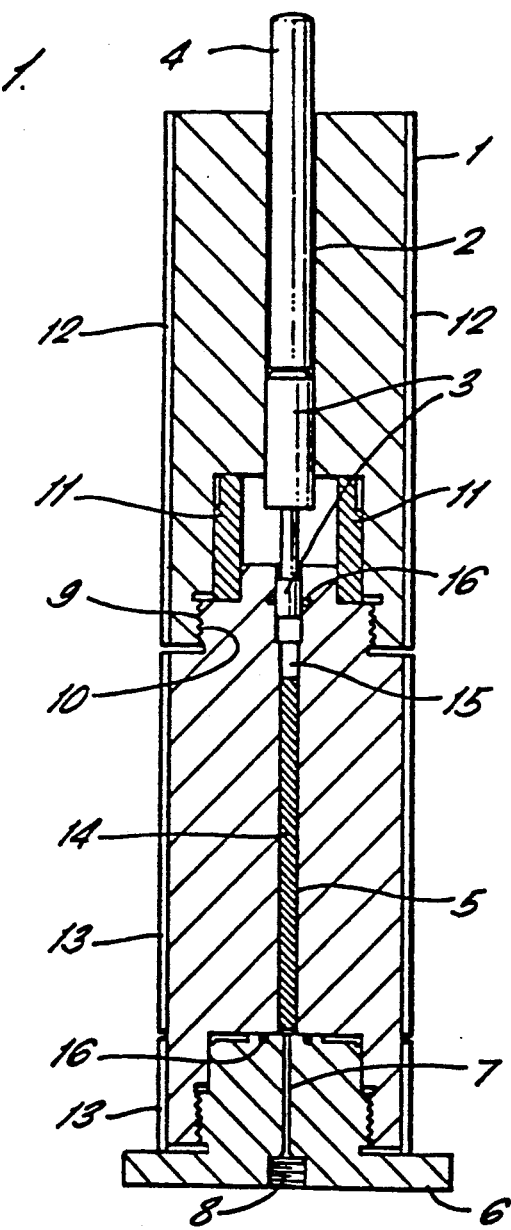
FIG. 1 shows in cross-section high pressure annealing apparatus.

Referring to FIG. 1 there is illustrated high pressure annealing apparatus 1 which comprises an upper cylindrical vessel 2 which is provided with a piston 3 which is provided with a pressure-type seal (not shown) with the surrounding housing. The piston is urged in the downward direction by a ram 4 and a screw-driven universal testing machine (not shown). The entire apparatus as shown in FIG. 1 is mounted in the compression zone of the machine. The lower cylindrical vessel 5 constitutes a pressure vessel, the vessel being provided with an end closure 6 which is provided with a central channel 7 to a port 8. The upper vessel 2 and the lower vessel 5 are assembled together in operative position by means of the threaded sections 9 and 10 on the upper and lower vessels 2 and 5, respectively. A cylinder 11 is positioned between the upper and lower vessels 2 and 5. The upper vessel and the pressure vessel are shrouded in separately controlled electrical band heaters 12, 13, which enables a uniform temperature distribution to be maintained within the pressure vessel. In use a billet of consolidated polyethylene 14 is positioned in the pressure vessel and a silicone fluid 15, such as DC 550 silicone oil, which is introduced into the pressure vessel before fitting the piston 3. Pressurisation of the silicone fluid is achieved by the compressive loading of the piston 3, the lower portion of which is located in the lower vessel during use. The pressure within the pressure vessel is monitored continuously by a foil-gauge pressure transducer (not shown). The transducer is incorporated in a pressure monitoring pipe which is connected into port 8 using standard high pressure fittings. Thermocouple leads monitoring temperature in the region of the billet pass through the pressurised cylindrical hole in the plug and through the pressure monitoring pipe to an insulated plug (not shown). Because the high temperatures and pressures used in the pressure vessel are severe, the seals 16 around the end closure 6 and the piston 3 employ an O ring/mitre ring combination which need frequent replacement. The apparatus shown in FIG. 1 was seated on a support stand to enable access for both the thermocouple assembly and the pressure transducer.

PRODUCTION OF WORKPIECE WITH EXTENDED CHAIN MORPHOLOGY

A billet of linear polyethylene was produced by a compaction procedure employing as-polymerised linear polyethylene powder (R-516 ex BP Chemicals Ltd. $M_w$ 7,742,000 and $M_n$ 13,600). The compaction equipment comprised a die and dual ram arrangement, the die itself being shrouded by a controlled band heater which enabled a uniform temperature to be achieved within the cavity of the die. The as-polymerised polyethylene powder was initially compressed by positioning the die with the powder therein within the compression zone of a 300 tonne hydraulic press. The powder was initially compressed to 200 MPa at the ambient temperature of 20° C. The applied pressure was then lowered and maintained at 130 MPa. The band heater around the die was then energized and the heating carried out until after about 40 minutes the polyethylene reached a final equilibrium temperature of 140° C. The pressure and temperature were maintained for a further 10 minute period after which the heater was switched off. The die and the contents were cooled by air jets with the 130 MPa pressure being maintained during cooling to ambient temperature. The product formed as a result of this high pressure compaction procedure was a powder-compacted disc of cohered particles of about 140 mm diameter and 20 mm in thickness. The disc was machined to provide a billet for high temperature/pressure annealing.

The billet 14 was introduced into the pressure vessel 5 displacing silicone oil which previously filled the vessel 5. The heater was energized and the pressure transducer was allowed to attain a temperature of about 150° C. After 20 minutes the pressure within the vessel was raised to approximately 300 MPa at room temperature. The heaters 12, 13 around both the upper and lower vessels 2, 3 were energized and as the heating proceeded the pressure was allowed to build up until after about 15 minutes a pressure of about 450 MPa was reached.

When a temperature of 230° C. was reached the pressure was held constant by appropriately withdrawing the piston. Approximately 40 minutes were required to attain this temperature which was within 5° C. of the required annealing temperature; at this point the temperature was raised at about 0.5° C./minute until the annealing temperature of 240° C. was reached, and thereafter these conditions were maintained until the billet was annealed. An annealing time of 0.5 hour at 240° C. was generally employed.

After the annealing was completed, the heaters of the upper and lower pressure vessels were switched off and an air fan was employed to cool both vessels while the pressure was held constant. An initial cooling rate of about 5° C./minute was employed. After about 20 minutes the vessels had cooled to about 160° C. and the pressure was maintained constant during this period. Thereafter the pressure was not controlled but was allowed to drop with decreasing temperature. Even though the pressure was not held constant at this stage, the drop of pressure was such that an undercooling of 80° C. was observed, but no structural changes occurred. The vessels were allowed to cool further to below 80° C. before the residual pressure was released and the annealed billet removed from the apparatus. The whole period for this annealing process to provide in the polyethylene the extended chain morphology took between 3 and 4 hours.

HYDROSTATIC EXTRUSION OF THE ANNEALED BILLET

Figure 2:
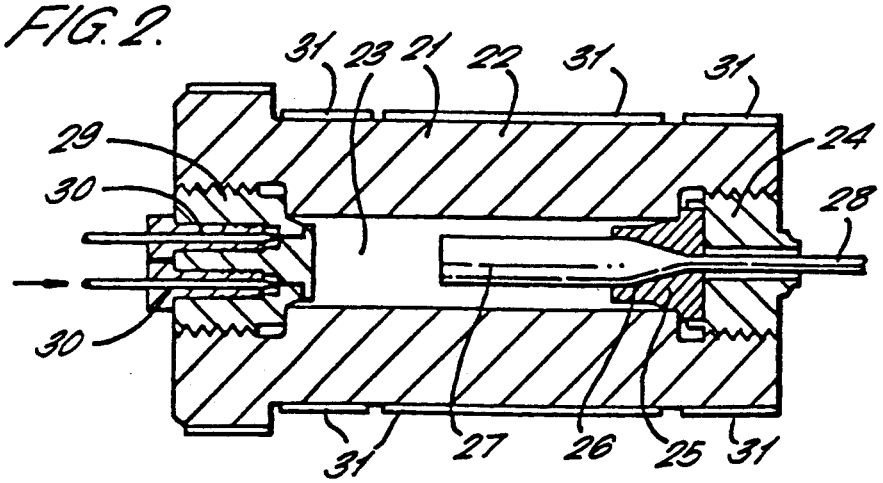
FIG. 2 shows in cross-section a hydrostatic extruder.

Referring to FIG. 2, there is shown in cross-section the hydrostatic extruder 21. It employs a Fielding Platt hydrostatic system capable of generating up to 7 MPa pressure. The extruder comprises a central barrel 22 which is generally cylindrical and contains a cylindrical pressure chamber 23. One end of the barrel is closed with a plug 24 which is screwed into the end of the barrel. Seated against the plug 24 is the extrusion nozzle 25 which includes a conical portion 26 and which effects the deformation of the billet 27 once the pressure vessel 23 is pressurised such that the billet is urged through the conical section and out to atmosphere to form the extrudate 28. At the opposite end of the barrel to plug 24 there is positioned plug 29 which contains passageways 30, the passageways constituting an inlet and outlet for the pressure transmitting fluid, castor oil. The extruder is fitted with electric heaters 31.

In the extrusion procedure, it has been found desirable, because of the brittle nature of the chain-extended linear polyethylene resulting from the annealing process, to employ a brass sheath (not shown) to protect and support the billet during the extrusion process. After loading a machined billet with a matching conical section into the hydrostatic extruder, the chamber 23 was filled with castor oil, and the heaters energized. After about one and a half hours the temperature of the fluid within the chamber 23 had reached 100° C. The pressure transmitted by the castor oil was increased to apply a load to the billet to bring about extrusion. This was achieved with a pressure of 52.5 MPa. When a small portion of the extrudate 28 emerged from the extruder a hauling-off load was applied in order to keep the extrudate in a linear condition. The pressure was then maintained at that value necessary to ensure a constant haul-off speed for the entire extrusion procedure. The workpiece (or billet) was extruded through the die at an extrusion speed of up to 20 mm/min.; and speeds of about 4 mm/min. were usually employed with an imposed deformation ratio of 7. At the termination of the extrusion, the temperature was, in each case, allowed to fall to below 100° C. before the pressure was released and the extrudate and the remaining end portion of the billet removed from the extruder.

The billet (before extrusion) had an initial melting point of 142° C. and the melting point of the extrudate was 141° C. The Young's modulus of the extruded billet, determined by a three-point bending test at room temperature (10 sec. value) was 30.6 GPa. X-ray studies indicated that the polymer of the extruded billet was oriented.

We claim:

1. A process for producing a polyethylene product which process comprises forming a workpiece which is to be extruded in the solid phase by consolidating under heat and pressure mass of solid particulate linear polyethylene to form a solid, cohered material, the linear polyethylene having a weight average molecular weight ($M_w$) from 300,000 to 3,000,000, wherein the consolidation is effected by melting only a surface layer of the particles of the polyethylene to form the solid, cohered material, which is then subjected to a temperature and pressure so that the linear polyethylene crystallizes in an extended chain morphology wherein said polyethylene has a melting point of at least 139.5° C. and a density of at least 0.98 g/cm$^3$, and thereafter deforming the workpiece in the solid phase to provide the polyethylene product, the deforming step being such as to provide a deformation ratio of at least 3.

2. A process for producing a polyethylene product which process comprises:
   (a) forming a workpiece of solid, cohered linear polyethylene by consolidating solid particulate linear polyethylene having a weight average molecular weight ($M_w$) from 300,000 to 3,000,000, under conditions below the melting point of the polyethylene at the applied pressure with the melting only of a surface layer of said particles of said polyethylene to form a solid, cohered material;

(b) subjecting said working to an elevated temperature and pressure sufficient to crystallize said workpiece in an extended chain morphology having a melting point of at least 139.5° C. and a density of at least 0.98 g/cm$^3$, and (c) deforming said workpiece in the solid phase to provide said polyethylene product at a deformation ratio of at least 3.

3. A process as claimed in claim 1 wherein $M_w$ is from 350,000 to 1,000,000.

4. A process as claimed in claim 1 wherein the polyethylene is deformed by extrusion through a reducing die to form a bar, strip, rod or tube.

5. A process as claimed in claim 1 wherein the linear polyethylene comprises a filler.

6. A process as claimed in claim 1 wherein the workpiece is extruded under hydrostatic pressure through a reducing die to effect the deformation.

7. A process as claimed in claim 6 wherein the hydrostatic extrusion is draw-assisted hydrostatic extrusion.

8. A process as claimed in claim 1 wherein the ambient pressure at which the deformation is effected is atmospheric pressure.

9. A process as claimed in claim 1 wherein the polyethylene is subjected to a deformation ratio of from 4 to 20.

10. A process according to claim 9 wherein the deformation ratio is from 8 to 14.

11. A process as claimed in claim 1 wherein the compacted polyethylene is heated to a temperature above 220° C. while being maintained in the solid phase by applied pressure.

12. A process as claimed in claim 11 wherein the polyetheylene is subjected to a pressure of at least 350 MPa.

13. A process as claimed in claim 1 wherein said process is carried out so as to provide an oriented linear polyethylene having a weight average molecular weight of from 350,000 to 1,00,000, which has been formed to a deformation ratio of from 3 to 20, and which has a Young's modulus of at least 30 GPa.

14. A process as claimed in claim 13, wherein the resulting polyethylene is in the form of reinforcement which is then incorporated in a hydraulic cementitious mass or organic thermoset mass and causing said mass to set.

* * * * *